United States Patent
Laskawy et al.

(10) Patent No.: US 12,403,882 B2
(45) Date of Patent: Sep. 2, 2025

(54) METHOD FOR BRAKE CONTROL OF A VEHICLE COMBINATION

(71) Applicant: ZF CV Systems Global GmbH, Bern (CH)

(72) Inventors: Ivo Laskawy, Hamburg (DE); Simon Pauka, Hannover (DE); Lars Volker, Seelze (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 98 days.

(21) Appl. No.: 18/541,619

(22) Filed: Dec. 15, 2023

(65) Prior Publication Data
US 2024/0198994 A1    Jun. 20, 2024

(30) Foreign Application Priority Data
Dec. 19, 2022   (DE) ..................... 10 2022 213 834.1

(51) Int. Cl.
  *B60T 17/22*   (2006.01)
  *B60T 8/17*   (2006.01)
  *B60T 13/68*   (2006.01)

(52) U.S. Cl.
  CPC ............ *B60T 17/22* (2013.01); *B60T 8/1708* (2013.01); *B60T 13/683* (2013.01)

(58) Field of Classification Search
  CPC ...... B60T 17/22; B60T 17/221; B60T 13/683; B60T 13/263; B60T 8/1708
  USPC .............................................. 701/70, 78, 83
  See application file for complete search history.

(56) References Cited

U.S. PATENT DOCUMENTS

| | | |
|---|---|---|
| 5,986,544 A | 11/1999 | Kaisers et al. |
| 9,650,030 B2 | 5/2017 | Nagura |
| 9,919,688 B2 | 3/2018 | Barth et al. |
| 2021/0284109 A1 | 9/2021 | Brutt et al. |
| 2022/0080939 A1 | 3/2022 | Brutt et al. |

FOREIGN PATENT DOCUMENTS

DE    199 55 798 A1    5/2001

OTHER PUBLICATIONS

German Patent Office, Search Report issued in German patent application No. 10 2022 213 834.1 (Sep. 12, 2023).

*Primary Examiner* — Hai H Huynh
(74) *Attorney, Agent, or Firm* — Finch & Maloney PLLC

(57) ABSTRACT

A method is disclosed for controlling the brakes of a vehicle combination that includes a tractor vehicle and at least one trailer vehicle. A brake control valve in the tractor vehicle has magnetic switching valves that controlled by an electronic control unit, including an inlet valve and an outlet valve. To determine a current trailer status, it is determined whether the tractor vehicle is connected to a trailer vehicle and/or the line volume of the brake control line. A target pressure to be produced in the brake control line is specified and is produced by pulse-like opening of the inlet valve and/or the outlet valve. The brake control pressure in the brake control line is measured during the pressure build-up of pressure and a characteristic value for the trailer status and/or for the line volume of the brake control line is determined.

17 Claims, 10 Drawing Sheets

METHOD FOR BRAKE CONTROL OF A VEHICLE COMBINATION

RELATED APPLICATIONS

This application claims the benefit of and right of priority under 35 U.S.C. § 119 to German Patent Application no. 10 2022 213 834.1, filed on 19 Dec. 2022, the contents of which are incorporated herein by reference in its entirety.

SUMMARY

The invention relates to a method for controlling the brakes of a vehicle combination, which consists of a tractor vehicle with a hydraulic or pneumatic brake system and at least one trailer vehicle that can be coupled to the tractor vehicle, with a pressure-controlled pneumatic brake system, and in which an electronically controlled brake control valve arranged in the tractor vehicle is used, which comprises at least two magnetic switching valves that can be actuated by an electronic control unit, the valves being in the form of an inlet valve and an outlet valve, wherein by means of the brake control valve a brake control pressure can be produced in a brake control line from a brake control outlet of the brake control valve, which line leads to a "Brake" coupling head of the tractor vehicle or to a trailer brake valve of the trailer vehicle and/or to a "Brake" coupling head at the rear of the trailer vehicle, and in which, to determine the current status of the trailer, it is determined whether the tractor vehicle is in fact connected to a trailer vehicle and/or how large the line volume of the brake control line is.

To be able to control a braking process of a vehicle combination in an optimum manner, knowledge of the current status of the trailer is useful, i.e., whether at least one trailer is coupled or no trailer vehicle is coupled to the tractor vehicle. It is true that whether or not a trailer vehicle is coupled can be recognized with any trailer plug-socket, indirectly by the prescribed monitoring of the flashing light on the trailer, or by virtue of a special association of two contacts of a 13-pole trailer plug-socket, with reference to whether the on-board electrical system of the trailer is or is not connected by a plug connection to the on-board electrical system of the tractor vehicle. However, the electric contacts of the plug on the trailer side and/or the socket on the tractor side can become corroded or dirty, or the signal line concerned can be broken at some point, so that an alternative determination of the trailer's status is advantageous.

Furthermore, for an optimum control of a braking process it is necessary, when a trailer is coupled on, to know the line volume of the brake control line running from the brake control outlet of the trailer control valve in the tractor vehicle to the brake control inlet of the trailer braking valve in the trailer vehicle, in order to be able to rapidly build up a specified brake control pressure in the brake control line for a largely delay-free actuation of the wheel brakes of the trailer vehicle. The trailer brake valve of the trailer vehicle is at least close to the tow bar or the hitch plate and therefore relatively far forward, which results in a relatively small line volume of the brake control line. However, since an agricultural tractor can tow up to two trailer vehicles, agricultural trailers are often provided at the rear with a trailer coupling and two pneumatic coupling heads for coupling a second trailer vehicle and for connecting its brake system. The brake control line of such a trailer vehicle runs from the coupling head concerned to the connection to the coupling head of the tractor vehicle, on the one hand as far as the trailer brake valve, and on the other hand, as far as the coupling head at the rear of the trailer vehicle, and this results in a comparatively large line volume of the brake control line.

In a method known from DE 10 2020 106 448 A1 for controlling the brakes of a vehicle combination, to enable an actuation of the wheel brakes with only a small delay it is provided that at the beginning of a braking process a pressure pulse is delivered that exceeds the brake control pressure to be built up, wherein the level and/or the duration of the pressure pulse is determined as a function of the line volume of the brake control line determined. The line volume of the brake control line is determined after every new start of operation of the tractor vehicle, in that when the wheel brakes are released the duration of the pressure drop and/or the average pressure gradient during the pressure drop in the brake control line are determined by sensor means and compared with stored reference values. With reference to the line volume determined, it is also recognized whether or not a trailer vehicle is coupled on. The size and/or duration of the pressure pulse delivered are increased with increasing line volume of the brake control line.

In DE 197 44 066 B4 a method is described for recognizing the operation of a trailer in a motor vehicle, in which method, when the brakes are actuated the pressure build-up in the brake control line leading to the trailer vehicle is detected by sensor means and from that a characteristic magnitude is determined, with reference to which trailer operation can be recognized. As the characteristic magnitude, the pressure gradient during the pressure build-up in the brake control line is determined and compared with a target pressure gradient specified by the actuation of the brake pedal in the tractor vehicle. If the pressure gradient is lower than the target pressure gradient, trailer operation is recognized, i.e., the fact that a trailer is coupled on.

From EP 2 918 469 B1 a device and a method for recognizing a coupled-on trailer vehicle are known, wherein it is provided that after the release of the wheel brakes the brake control pressure in the brake control line leading from the trailer control valve of the tractor vehicle to the "Brake" coupling head or to the trailer brake valve of a brake control valve of a coupled trailer is determined by sensor means. From the variation of the brake control pressure during the pressure drop, the time interval until a specified pressure value has been reached is determined and compared with a predetermined time value. If the time duration of the pressure drop is shorter than the predetermined time interval, it is recognized that no trailer is coupled on. If the time duration of the pressure drop equals or exceeds the predetermined time value, then it is recognized that a trailer vehicle is in fact coupled on.

The purpose of the present invention, then, is to propose a method for controlling the brakes of a vehicle combination, of the type mentioned to begin with, in which method at least one alternative option for determining the trailer status of a tractor vehicle and the line volume of the brake control line is indicated.

This objective is achieved by methods with the characteristics disclosed herein. Advantageous further developments of the methods will be apparent in light of the present disclosure.

Accordingly, the invention relates to a method for controlling the brakes of a vehicle combination consisting of a tractor vehicle with a hydraulic or pneumatic brake system and at least one trailer vehicle that can be coupled to it and that comprises a pressure-controlled pneumatic brake system, and in which an electronically controlled brake control valve in the tractor vehicle is used, which valve comprises at least two magnetic switching valves that can be actuated by an electronic control unit, these valves being in the form of an inlet valve and an outlet valve, such that by means of the brake control valve a brake control pressure can be produced in a brake control line running from a brake control outlet of the brake control valve to a "Brake" coupling head of the tractor vehicle or to a trailer brake valve of the trailer vehicle and/or a "Brake" coupling head at the rear of the trailer vehicle, and in which method, to determine the current trailer status, it is determined whether the tractor vehicle is connected to a trailer vehicle and/or how large the line volume of the brake control line is.

To achieve the stated objective, it is provided that a target pressure to be produced in the brake control line is specified, that the target pressure is produced in the brake control line by pulse-like openings of the inlet valve and/or pulse-like openings of the outlet valve, and that the brake control pressure in the brake control line is measured by sensor means during the pressure build-up, and that from the pressure variation with time of the brake control pressure and/or the variation with time of the switching states of the inlet valve and/or the outlet valve until the target pressure has been reached, a characteristic value is determined for the trailer status of the tractor vehicle and/or the line volume of the brake control line and compared with a reference value stored in a data memory of the control unit, and depending on the result of the comparison, the trailer status of the tractor vehicle and/or the line volume of the brake control line are determined.

Thus, the invention starts from a vehicle combination consisting of a tractor vehicle with a hydraulic or pneumatic brake system and at least one coupled-on trailer vehicle with a pressure-controlled pneumatic brake system. In the vehicle combination, by means of an electronically controlled brake control valve arranged in the tractor vehicle, which valve comprises at least two magnetic switching valves, namely an inlet valve and an outlet valve that can be controlled by an electronic control unit, a brake control pressure can be produced in a brake control line that runs from a brake control outlet of the brake control valve to a "Brake" coupling head of the tractor vehicle or to a trailer brake valve of the trailer vehicle and/or a "Brake" coupling head at the rear of the trailer vehicle.

By specifying a target pressure and producing it in the brake control line by pulse-like openings of the inlet valve and/or pulse-like openings of the outlet valve, until the target pressure is reached, there is an increase of the brake control pressure and a plurality of switching states of the inlet valve and/or the outlet valve with which at least one characteristic value can be determined, this value characterizing the trailer status of the tractor vehicle and/or the line volume of the brake control line.

The trailer status indicates whether a trailer vehicle is coupled on or whether no trailer vehicle is coupled on. By comparing the characteristic value with at least one reference value determined beforehand as a function of the trailer status of the tractor vehicle and/or the line volume of the brake control line and stored in a data memory of the control unit, the trailer status of the tractor vehicle and/or the line volume of the brake control line can be determined. The brake control line can be vented by opening pulses of the inlet valve and/or the outlet valve, which have a variable pulse width and/or a variable time interval between the pulses. In this case the pulse width at the start of the venting process is made relatively large and with increasing approach of the brake control pressure to the target pressure it is reduced. In contrast, the pulse separation at the start of venting the brake control line is made relatively small and is increased with increasing approach of the brake control pressure to the target pressure.

For that purpose, according to a first method variant it is provided that the pulse widths $PW_{IV}$ and $PW_{OV}$ of the inlet and outlet valves are determined until the target pressure $p_Z$ has been reached, and in each case separately they are added to give a pulse width sum $\Sigma\ PW_{IV}$ for the inlet valve and a pulse width sum $\Sigma\ PW_{OV}$ for the outlet valve, and by subtracting the pulse width sum $\Sigma\ PW_{OV}$ for the outlet valve from the pulse width sum $\Sigma\ PW_{IV}$ for the inlet valve a pulse width sum difference $\Sigma\ PW_{IV} - \Sigma\ PW_{OV}$ is determined as a characteristic value, and by a comparison of the current pulse width sum difference $\Sigma\ PW_{IV} - \Sigma\ PW_{OV}$ with pulse width sum difference values determined beforehand as reference values for various line volumes of the brake control line and stored, the current trailer status of the tractor vehicle and/or the current line volume $V_{BC}$ of the brake control line are determined.

This first method variant, and also the three method variants described below, utilize the effect that the venting of the brake control line until the target pressure has been reached takes a long time, indeed the more so the longer the brake control line and the larger its line volume. Correspondingly, to reach the target pressure opening pulses of the inlet valve with larger pulse widths and/or more opening pulses of the inlet valve are needed, and/or the time to reach the target pressure is longer, the longer is the brake control line and the larger is its line volume.

According to a second method variant, it is provided that the opening pulse $P_{IV}$ of the inlet valve and/or the opening pulse $P_{OV}$ of the outlet valve until the target pressure $p_Z$ is reached, is/are determined and summed to obtain an opening pulse number $n_P$ as a characteristic value, and by comparing the current opening pulse number with opening pulse number values determined beforehand and stored for various line volumes of the brake control line as reference values, the current trailer status of the tractor vehicle and/or the current line volume $V_{BC}$ of the brake control line are determined.

According to a third method variant, it is provided that the number of opening pulses $P_{IV}, P_{OV}$ of the inlet valve and the outlet valve until the target pressure $p_Z$ has been reached is detected, and these are added separately to obtain a number of opening pulses $\Sigma\ n_{P\_IV}$ for the inlet valve and a number of opening pulses $\Sigma\ n_{P\_OV}$ for the outlet valve, and by subtracting the opening pulse number $\Sigma\ n_{P\_OV}$ for the outlet valve from the opening pulse number $\Sigma\ n_{P\_IV}$ for the inlet valve, a pulse number difference ($\Sigma\ n_{P\_IV} - \Sigma\ n_{P\_OV}$) is determined as a characteristic value, and by a comparison of the current pulse number difference $\Sigma\ n_{P\_IV} - \Sigma n_{P\_OV}$ with pulse number differences determined beforehand and stored for various line volumes of the brake control line as reference values, the current trailer status of the tractor vehicle and/or the current line volume $V_{BC}$ are determined.

A fourth method variant provides that the time period $\Delta p_z$ until the target pressure $p_Z$ has been reached is determined and forms a characteristic value as the pressure build-up time, and by comparing the current pressure build-up time $\Delta p_z$, with pressure build-up times determined beforehand and stored for various line volumes of the brake control line as reference values, the current trailer status of the tractor vehicle and/or the current line volume $V_{BC}$ of the brake control line are determined.

In a fifth method variant, the effect is utilized that in the air column of the compressed air enclosed in the brake control line pressure oscillations are excited by the pulse-like opening of the inlet valve and/or by the pulse-like opening of the outlet valve, the number and amplitude of these oscillations differing as a function of the length and line volume of the brake control line. Accordingly, in this method variant it is provided that the number and/or the average amplitude of pressure oscillations of the brake control pressure $p_{BC}$ until the target pressure $p_Z$ has been reached is determined as a number of oscillations $n_S$ and/or an average oscillation amplitude $A_{S\_m}$ that forms a characteristic value, and by comparing the current oscillation number $n_S$ and/or the current oscillation amplitude $A_{S\_m}$ with oscillation number values and/or oscillation amplitude values determined beforehand and stored for various line volumes of the brake control line as reference values, the current trailer status of the tractor vehicle and/or the current line volume $V_{BC}$ of the brake control line are determined.

In a further development of the method variants, it is provided that the trailer status as regards a trailer vehicle that is not coupled is recognized if the current characteristic value $\Sigma PW_{IV}$–$\Sigma PW_{OV}$, $n_P$, $\Delta pz$, $n_S$, $A_{S\_m}$, matches to within a specified tolerance a reference value determined when a trailer vehicle is not coupled, and the trailer status as regards a coupled trailer vehicle is recognized if the current characteristic value $\Sigma PW_{IV}$–$\Sigma PW_{OV}$, $n_P$, $\Delta pz$, $n_S$, $A_{S\_m}$ is larger than the reference value determined when a trailer vehicle is not coupled.

In addition, it can be provided that the line volume $V_{BC}$ of the brake control line is determined as the line volume of a brake control line extending as far as the "Brake" coupling head, if the current characteristic value $\Sigma PW_{IV}$–$\Sigma PW_{OV}$, $n_P$, $\Delta pz$, $n_S$, $A_{S\_m}$ matches, to within a specified tolerance, the reference value determined when a trailer vehicle is not coupled.

Furthermore, it can be provided that the line volume $V_{BC}$ of the brake control line is determined as the line volume from a reference value determined when a trailer vehicle is coupled, if the current characteristic value $\Sigma PW_{IV}$–$\Sigma PW_{OV}$, $n_P$, $\Delta pz$, $n_S$, $A_{S\_m}$ matches, to within a specified tolerance, the reference value concerned, or is determined by interpolation between two line volume values from two reference values determined when a trailer vehicle is coupled, if the current characteristic value $\Sigma PW_{IV}$–$\Sigma PW_{OV}$, $n_P$, $\Delta pz$, $n_S$, $A_{S\_m}$ lies between the two reference values concerned.

A process sequence independent of the embodiments mentioned above also relates to a method for controlling the brakes of a vehicle combination which consists of a tractor vehicle with a hydraulic or pneumatic brake system, and at least one trailer vehicle that can be coupled on and which has a pressure-controlled pneumatic brake system, and in which an electronically controlled brake control valve arranged in the tractor vehicle is used, which valve comprises at least two magnetic switching valves that can be controlled by an electronic control unit and are respectively in the form of an inlet valve and an outlet valve, wherein by means of the brake control valve a brake control pressure can be produced in a brake control line that runs from a brake control outlet of the brake control valve to a "Brake" coupling head of the traction vehicle or to a trailer brake valve of the trailer vehicle and/or to a "Brake" coupling head at the rear of the trailer vehicle, and in which, to determine the current trailer status, it is determined whether the tractor vehicle is in fact coupled to a trailer vehicle and/or how large the line volume of the brake control line is.

To achieve the stated objective of the invention, in this method it is provided that a pneumatic pressure pulse with a fixed opening duration $\Delta t_{IV}$ of the inlet valve to be delivered into the brake control line is specified, and that the pressure pulse is produced by pulse-like opening of the inlet valve into the brake control line, and that the brake control pressure $p_{BC}$ present in the brake control line after a predetermined time interval $\Delta t_P$ since the inlet valve was closed is determined as a residual pressure $\Delta p_R$ by sensor means, and that the residual pressure $\Delta p_R$ is compared with at least one reference pressure value determined beforehand as a function of the trailer status of the tractor vehicle and/or the line volume of the brake control line and stored in a data memory of the control unit, and that depending on the result of the comparison, the trailer status of the tractor vehicle and/or the line volume $V_{BC}$ of the brake control line are determined.

In this case, the effect utilized is that the residual pressure remaining after a controlled pressure pulse becomes progressively lower with increasing length and correspondingly increasing line volume of the brake control line. Thus, it can be provided that the trailer status as regards an uncoupled trailer vehicle is recognized if the current residual pressure $\Delta p_R$ matches, to within specified tolerance, a reference pressure value determined when no trailer vehicle is coupled, and the trailer status as regards a coupled trailer vehicle is recognized if the current residual pressure $\Delta p_R$ is lower than the reference pressure value determined without a coupled trailer vehicle.

Moreover, it can be provided that the line volume $V_{BC}$ of the brake control line is determined as the line volume of a brake control line that runs to the "Brake" coupling head, if the current residual pressure $\Delta p_R$ matches, to within a specified tolerance, the reference pressure value determined without a coupled trailer vehicle.

However, the line volume $V_{BC}$ of the brake control line is determined as the line volume of a reference pressure value determined with a coupled trailer vehicle, if the current residual pressure $\Delta p_R$ matches, to within a specified tolerance, the reference pressure value concerned.

Besides, the line volume $V_{BC}$ of the brake control line can be determined by an interpolation between two line volume values of two reference pressure values determined when a trailer vehicle is coupled, if the current residual pressure $\Delta_{PR}$ is between the two reference pressure values concerned.

After a longer interruption of the driving, the supply pressure in the supply lines of a tractor vehicle, a trailer vehicle, and in the storage containers connected to them can fall due to leakage, so that when the operation of the tractor vehicle starts again, at first a relatively low supply pressure is available. Since the brake control line is vented from the supply line of the tractor vehicle on the input side by way of the trailer control valve, producing the target pressure when the supply pressure is low requires opening pulses of the inlet valve with larger pulse widths and/or more opening pulses of the inlet valve and/or more time. Likewise, when the supply pressure is low more pressure oscillations and/or pressure oscillations with a greater or smaller amplitude can be excited in the brake control line and after the delivery of a pressure pulse the residual pressure in the brake control line may be lower.

It is therefore advantageous if, in all the methods and method variants mentioned, the current trailer status of the tractor vehicle and/or the current line volume $V_{BC}$ of the brake control line are determined and, in addition, the current supply pressure $p_V$ in a supply line of the tractor vehicle is measured, and the comparison of the respective characteristic value $\Sigma PW_{IV}$–$\Sigma PW_{OV}$, $n_P$, $\Delta pz$, $n_S$, $A_{S\_m}$ and the residual pressure $\Delta p_R$ is compared with reference values or reference pressure values determined and stored beforehand for the corresponding supply pressure $p_V$.

To increase the accuracy, it can also be provided that the current trailer status of the tractor vehicle and/or the current line volume $V_{BC}$ of the brake control line are determined by a combination of at least two of the method variants mentioned.

In accordance with another further development of the method the current trailer status of the tractor vehicle and/or the current line volume of the brake control line are determined automatically, i.e., without an actuation of the brake pedal by the driver, each time the operation of the tractor vehicle begins afresh, i.e., when the on-board electrical system is switched on by the driver, and/or after each time that the parking brake in the tractor vehicle is released by the driver.

BRIEF DESCRIPTION OF THE DRAWINGS

Below, the invention is described in greater detail with reference to the example embodiments illustrated in the attached drawing, which shows.

DETAILED DESCRIPTION

Figure 10:
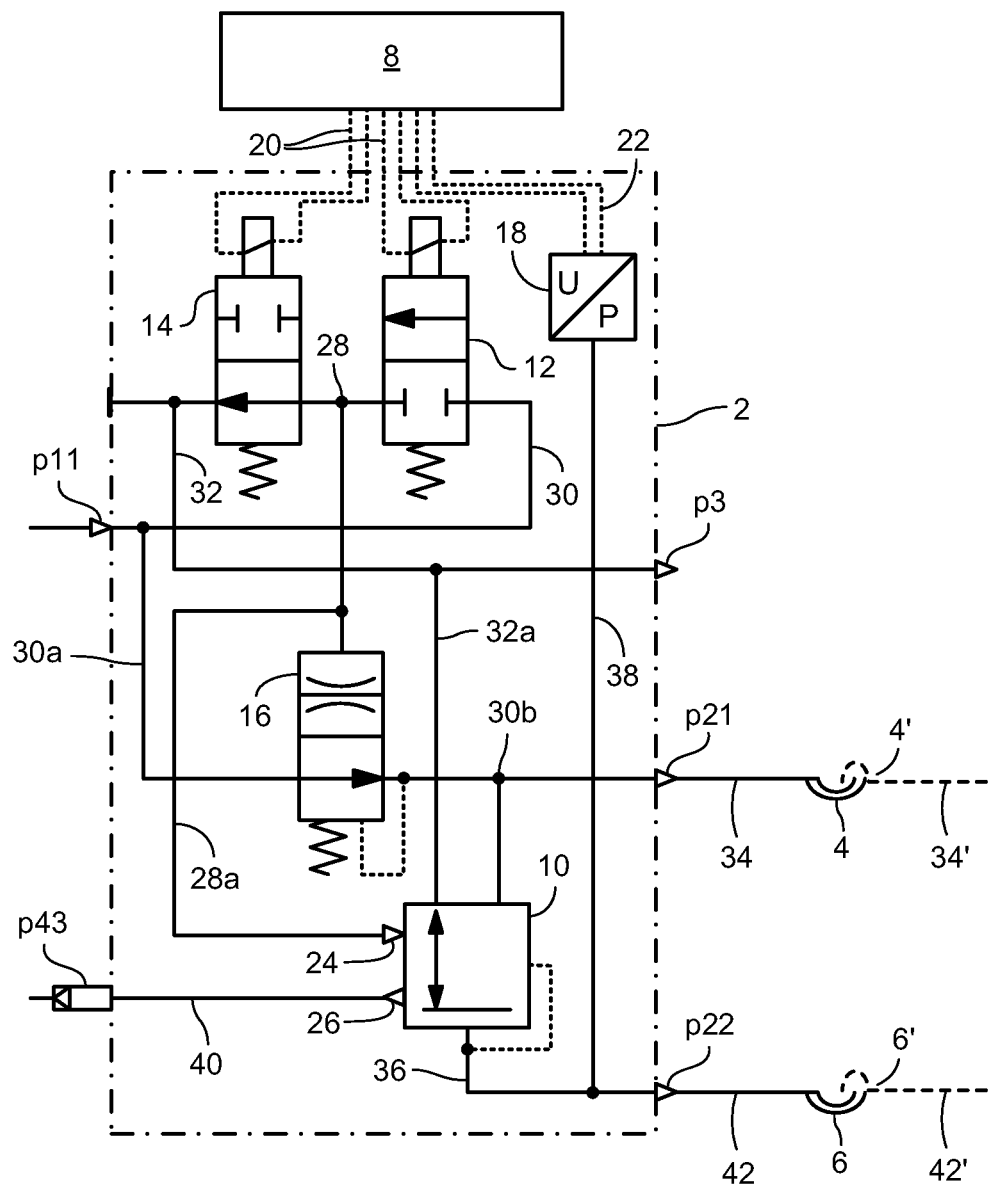
FIG. 10: A known trailer control valve for carrying out the method.

In FIG. 10 an electronically controlled trailer control valve 2 of a tractor vehicle is shown as an example, which is known from the previously unpublished DE 10 2020 124 225.5 and is suitable for carrying out the method for controlling the brakes of a vehicle combination described below. The vehicle combination shown therein and also mentioned here consists of a tractor vehicle with a hydraulic or pneumatic brake system and at least one trailer vehicle that can be coupled to it, with a pressure-controlled pneumatic brake system.

The trailer control valve 2 comprises a pneumatically controlled relay valve 10, a pneumatically controlled breakaway valve 16, an inlet valve 12, an outlet valve 14 and a pneumatic pressure sensor 18. The inlet valve 12 and the outlet valve 14 are in each case in the form of 2/2-way magnetic switching valves, by means of which a pneumatic control pressure applied at a control inlet 24 of the relay valve 10 can be produced.

The switching magnets of the inlet valve 12 and the outlet valve 14 are connected to an associated electronic control unit 8 by electrical control lines 20, and the pressure sensor 18 is connected thereto by electric sensor lines 22.

The inlet valve 12 is closed when not energized and open when energized. The outlet valve 14 is open when not energized and closed when energized. A control pressure line 28, which leads from the outlet of the inlet valve 12 and from the inlet of the outlet valve 14 to a control inlet of the breakaway valve 16 and via a line branch 28a to the direct first control inlet 24 of the relay valve 10, can be connected by way of the inlet valve 12 to an internal supply pressure line 30 and by way of the outlet valve 14 to a venting line 32 that leads to a venting outlet p3. A supply pressure line 30 is connected to a supply pressure inlet p11 of the trailer control valve 2.

In the installed condition of the trailer control valve 2, an external supply pressure line of a pneumatic compressed-air supply unit of the tractor vehicle is connected to the supply pressure inlet p11, which when the drive motor of the tractor vehicle is running, carries a supply pressure of around $7.5 \times 10^5$ Pa. A line section 30a branching off from the supply pressure line 30 leads via the breakaway valve 16 and a line section 30b on the output side to a supply pressure outlet p21 of the trailer control valve 2. To this supply pressure outlet p21 is connected, via an external supply pressure line 34, a "Supply" coupling head (red) 4. When a trailer vehicle is coupled, to the "Supply" coupling head 4 on the tractor vehicle side there is connected a supply pressure line 34' of the trailer vehicle via a "Supply" coupling head 4' on the trailer side, which leads to a trailer brake valve and at least one storage container of the trailer.

A supply pressure inlet of the relay valve 10 is connected to the supply pressure line 30 by way of the branched line section 30a and the line section 30b on the outlet side. A venting outlet of the relay valve 10 is connected by way of a connecting line 32a to the venting line 32 that leads to the venting outlet p3. A brake control outlet of the relay valve 10 leads via a brake control line 36 on the outlet side to a brake control outlet p22 of the trailer control valve 2.

To the brake control outlet p22 is connected a "Brake" coupling head (yellow) 6 via an external brake control line 42. When a trailer vehicle is coupled, a brake control line 42' of the trailer is connected to the "Brake" coupling head 6 on the tractor vehicle side by way of a "Brake" coupling head 6' on the trailer side, which leads to the trailer brake valve (not shown) of the trailer vehicle and, if present, to a "Brake" coupling head positioned at the rear of the trailer vehicle for connecting the brake control line of a second trailer vehicle.

The pressure sensor 18 is connected by way of a sensor pressure line 38 to the brake control line 36 on the outlet side. A further control pressure line 40 is arranged between an inverted control pressure inlet p43 of the trailer control valve 2 and an inverted second control inlet 26 of the relay valve 10.

During a braking process, a target pressure $p_Z$ is determined in the electronic control unit 8 from a braking value communicated by a brake control unit in the tractor vehicle, which is then produced in the trailer control valve 2 by pulse-like opening and closing of the inlet valve 12 and the outlet valve 14 by means of the relay valve 10 in the brake control line 42, 42'. When a trailer vehicle is coupled, the corresponding brake control pressure ($p_{BC}=p_Z$) in the trailer brake valve of the trailer vehicle leads to the production of a corresponding brake pressure for actuating the wheel-brake cylinders of the trailer vehicle.

To be able to control a braking process of a vehicle combination in an optimum manner, knowledge about the trailer status is useful, namely whether at least one trailer vehicle is coupled to the tractor vehicle or whether no trailer vehicle is coupled. In addition, for that purpose, when a trailer vehicle is coupled it is necessary to know the line volume of the brake control line 42, 42' that runs from brake control outlet 22 of the trailer control valve 2 in the tractor vehicle to the brake control inlet of the trailer control valve in the trailer vehicle, in order to be able to build up the specified brake control pressure ($p_{BC}=p_Z$) quickly in the brake control line 42, 42' for a largely delay-free actuation of the wheel brakes of the trailer vehicle. Thus, for example, in a method for controlling the brakes of a vehicle combination as described in DE 10 2020 106 448 A1, for this purpose it is provided that at the beginning of a braking process a pressure pulse higher than the brake control pressure to be produced is delivered into the brake control line, the level and/or the duration of which pulse depend(s) on the line volume of the brake control line determined.

In the above method it is generally provided that, preferably automatically, after every fresh operation of the tractor vehicle and/or after each releasing of the parking brake in the tractor vehicle, a target pressure $p_Z$ to be produced in the brake control line 42, 42' is determined and specified, and that the target pressure $p_Z$ is produced in the brake control line 42, 42' by pulse-like opening of the inlet valve 12 and/or the outlet valve 14, and that the brake control pressure $p_{BC}$ in the brake control line 42, 42' is detected by sensor means during the pressure build-up, and that from the variation of the brake control pressure and/or from the switching states of the inlet valve 12 and/or the outlet valve 14, until the target pressure $p_Z$ has been reached a characteristic value is determined for the trailer status of the tractor vehicle and/or for the line volume $V_{BC}$ of the brake control line 42, 42', and that this characteristic value is compared with at least one reference value determined beforehand as a function of the trailer status of the tractor vehicle and/or the line volume $V_{BC}$ of the brake control line 42, 42' and stored in a data memory of the control unit 8, and that depending on the result of the comparison the trailer status of the tractor vehicle and/or the line volume $V_{BC}$ of the brake control line 42, 42' is/are determined.

Figure 1:
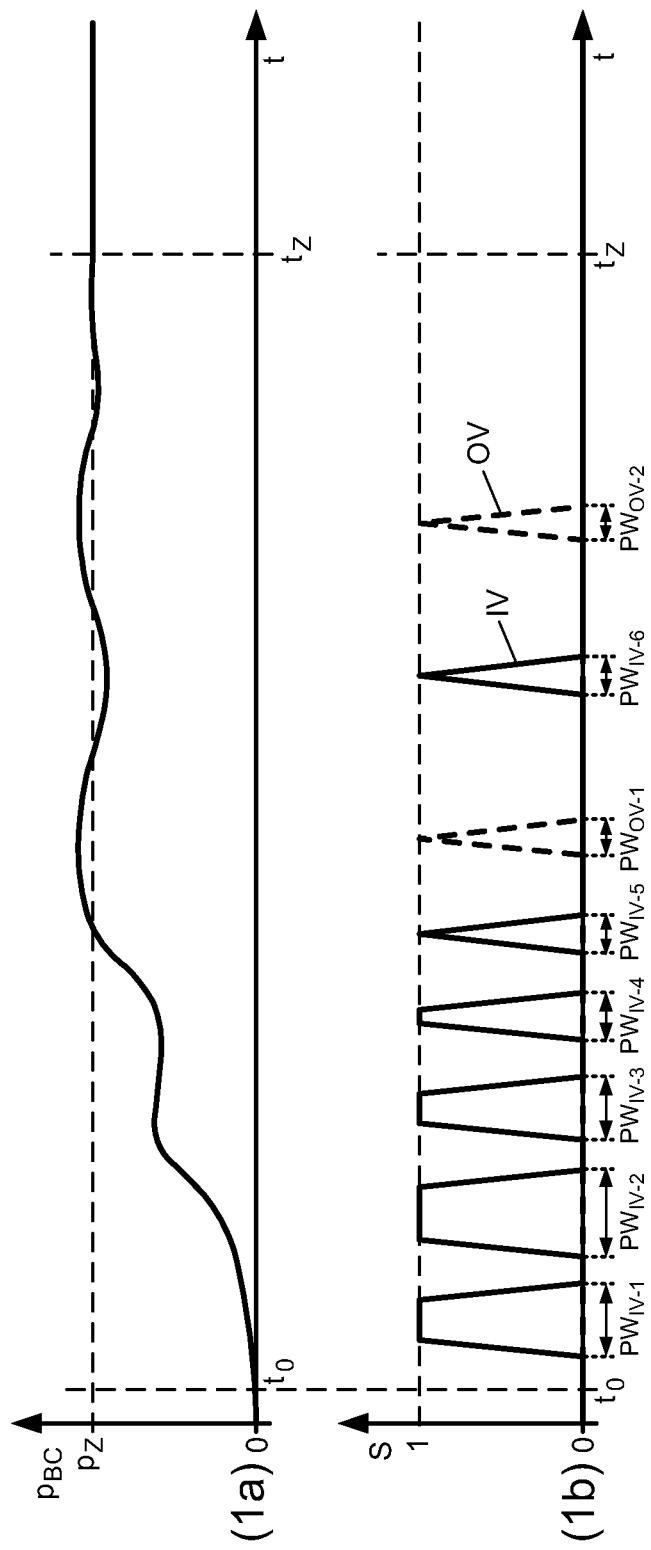
FIG. 1: A brake control pressure variation over time, and associated switching conditions of the pulse-like opening and closing of inlet valves and outlet valves during the production of a target pressure in a brake control line.
Figure 2:
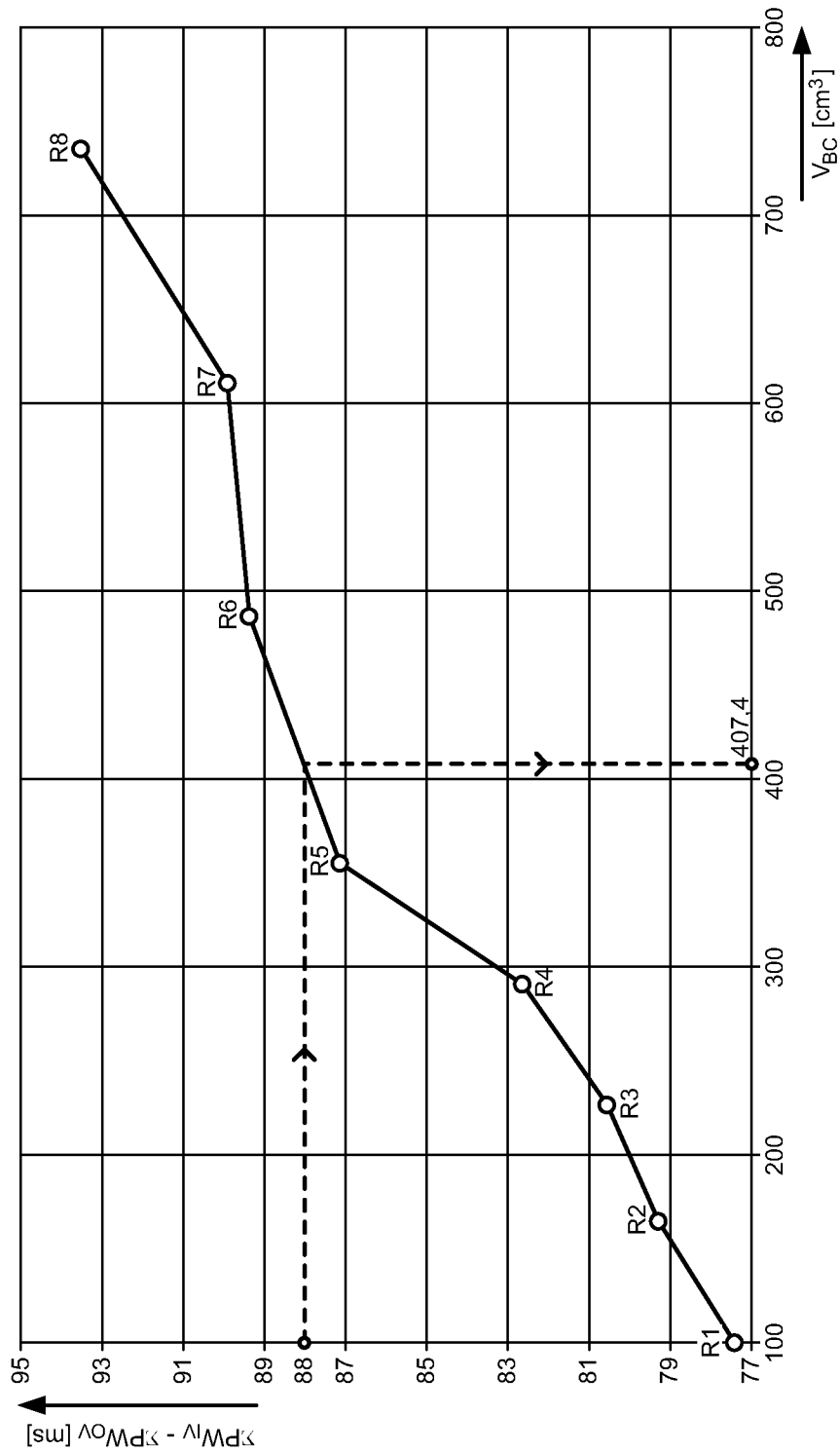
FIG. 2: In a diagram, the values of pulse width sum differences as a function of line volumes of a brake control line, FIG. 3, including plots 3a and 3b: A brake control pressure variation over time, and associated switching conditions of a pulse-like opening and closing of an inlet valve during the production of a target pressure in a brake control line when no trailer vehicle is coupled, FIG. 4, including plots 4a and 4b: A brake control pressure variation over time, and associated switching conditions of a pulse-like opening and closing of an inlet valve during the production of a target pressure in a brake control line when a trailer vehicle is coupled, FIG. 5, including plots 5a and 5b: A brake control pressure variation over time, and associated switching conditions of a pulse-like opening and closing of an inlet valve during the production of a target pressure in a brake control line when no trailer vehicle is coupled, FIG. 6, including plots 6a and 6b: A brake control pressure variation over time, and associated switching conditions of a pulse-like opening and closing of an inlet valve during the production of a target pressure in a brake control line when a trailer vehicle is coupled.

A first method variant is illustrated in the diagrams of FIG. 1 and FIG. 2. In the upper part-diagram (1a) of FIG. 1, the variation of the brake control pressure $p_{BC}$ during the pressure build-up is shown from time-point $t_0$ until the target pressure $p_Z$ is reached at time-point $t_Z$. In the lower part-diagram (1b) of FIG. 1, the switching states (0=closed, 1=open) of the inlet valve 12 and the outlet valve 14 are shown, with different pulse width sizes $PW_{IV}$ relating to the inlet valve 12 and $PW_{OV}$ relating to the outlet valve 14. The pulses for actuating the inlet valve 12 are shown by continuous lines and marked IV=Inlet Valve. The pulses for actuating the outlet valve 14 are shown by broken lines and marked OV=Outlet Valve. As regards the inlet valve 12, it can be seen that the first pulse width $PW_{IV\_1}$ is smaller than the second pulse width $PW_{IV\_2}$ and that the first pulse width $PW_{IV\_1}$ of the inlet valve 12 is larger than the third pulse width $PW_{IV\_3}$ to the sixth pulse width $PW_{IV\_6}$. The two pulse widths $PW_{OV\_1}$ and $PW_{OV\_1}$ for actuating the outlet valve 14 are each of the same length.

FIG. 2 shows in a diagram a curve with reference values R1, R2, R3, R4, R5, R6, R7, and R8 determined beforehand, for example during the development of the tractor vehicle and the trailer vehicle, in the form of pulse width sum differences $\Sigma PW_{IV}-\Sigma PW_{OV}$ as a function of the line volume $V_{BC}$ of a brake control line of the tractor vehicle and the trailer vehicle coupled thereto if there is one.

To determine a characteristic value, the pulse widths $PW_{IV}$ and $PW_{OV}$ of the inlet valve 12 and the outlet valve 14, shown in FIG. 1, until the target pressure $p_Z$ is reached are determined separately, added to form pulse width sums $\Sigma PW_{IV}$ and $\Sigma PW_{OV}$, and the reference value is determined by subtraction to obtain a pulse width sum difference $\Sigma PW_{IV}-\Sigma PW_{OV}$. Thereafter, by comparing the current pulse width sum difference $\Sigma PW_{IV}-\Sigma PW_{OV}$ with the pulse width sum differences $\Sigma PW_{IV}-\Sigma PW_{OV}$ determined beforehand for various line volumes $V_{BC}$ of the brake control line as reference values and stored, the current trailer status of the tractor vehicle and the current line volume $V_{BC}$ of the brake control line 42, 42' is/are determined.

A shown by FIG. 2, the current pulse width sum difference $\Sigma PW_{IV}-\Sigma PW_{OV}$ has, for example, a value of 88 milliseconds ($\Sigma PW_{IV}-\Sigma PW_{OV}=88$ ms). Since that value is larger than the reference value R1 ($\Sigma PW_{IV}-\Sigma PW_{OV}=77.5$ ms) determined beforehand for when no trailer vehicle is coupled, the trailer status determined is one in which a trailer vehicle is in fact coupled to the tractor vehicle. Furthermore, the current pulse width sum difference $\Sigma PW_{IV}-\Sigma PW_{OV}$ is between the reference values R5 and R6 which, by interpolation, gives a line volume $V_{BC}$ of the brake control line 42, 42' of $V_{BC}=407.5$ cm.

Figure 3:
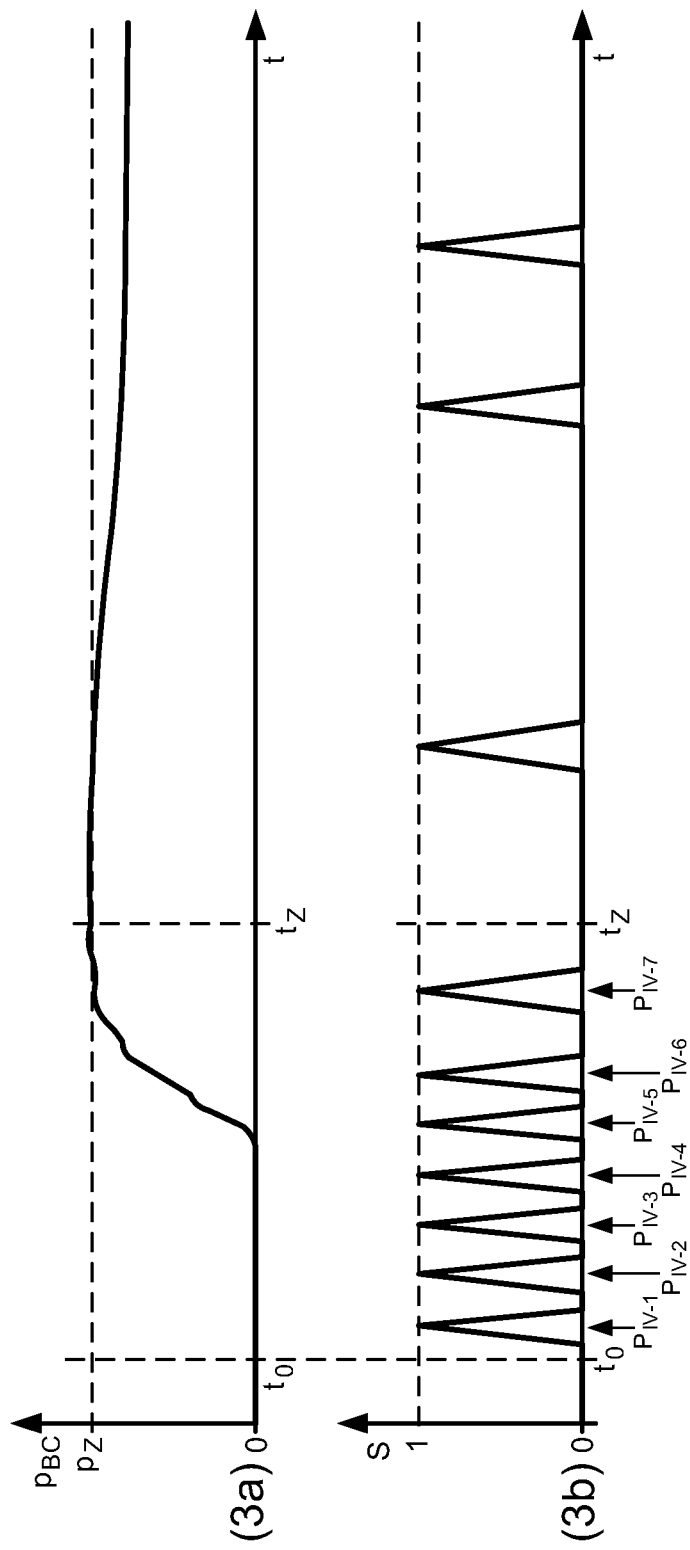
Figure 4:
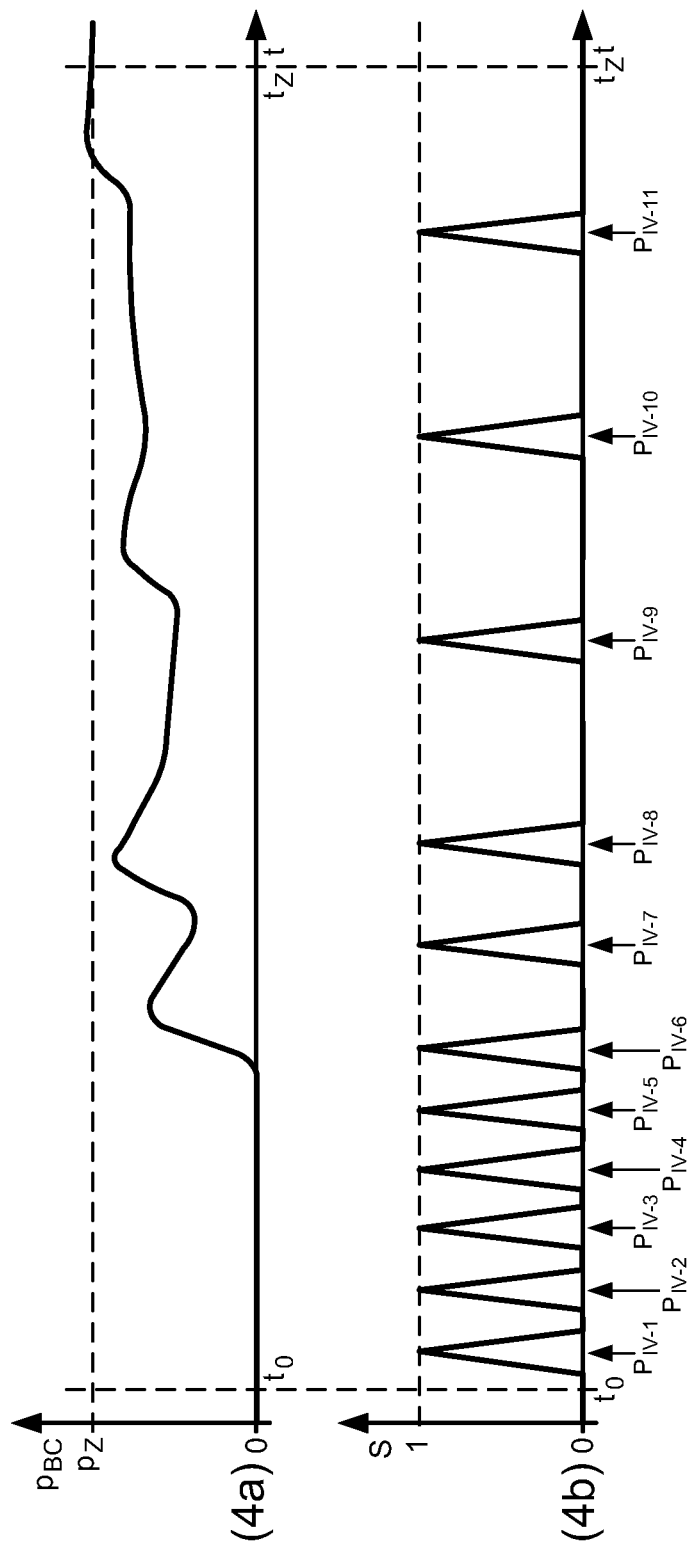

A second method variant is illustrated in FIGS. 3 and 4, wherein the part-diagram 3a of FIG. 3 shows the time variation of the brake control pressure $p_{BC}$ during the pressure build-up between time-point to and time-point $t_Z$ when the target pressure $p_Z$ is reached. In the part-diagram 3b the switching states (0=closed, 1=open) of the inlet valve 12, respectively when no trailer vehicle is coupled, are shown. In FIG. 4, the part-diagram 4a shows the time variation of the brake control pressure $p_{BC}$ during the pressure build-up from time to until the target pressure $p_Z$ is reached at time $t_Z$, while the part-diagram 4b shows the switching states (0=closed, 1=open) of the inlet valve 12, respectively, when a trailer vehicle is coupled.

To determine a characteristic value, the opening pulses $P_{IV\_1}$ to $P_{IV\_11}$ of the inlet valve 12 required until the target pressure $p_Z$ is reached are summed to form an opening-pulse number $n_P$ as a reference value. Thereafter, by a comparison of the current opening-pulse number with opening-pulse number values determined beforehand for various line volumes $V_{BC}$ of the brake control line and stored as reference values, the current trailer status of the tractor vehicle and the current line volume $V_{BC}$ of the brake control line 42, 42' are determined.

From a comparison of FIGS. 3 and 4 it can be seen that until the target pressure $p_Z$ in the brake control line 42, 42' is reached, when a trailer vehicle is coupled (FIG. 4) substantially more opening pulses $P_{IV}$ are needed than when no trailer vehicle is coupled (FIG. 3). Whereas with no coupled trailer vehicle seven opening pulses $P_{IV\_1}$ to $P_{IV\_7}$ of the inlet valve 12 are needed to produce the target pressure $p_Z(n_P=7)$, to do this with a trailer vehicle coupled eleven opening pulses $P_{V\_1}$ to $P_{IV\_11}$ are needed ($n_P=11$). Analogously to the first method variant, in this case it is also provided that when no trailer vehicle is coupled, this trailer status is recognized if the current characteristic value, in this case the current opening-pulse number $n_P$, matches to within a specified tolerance a reference value determined with no coupled trailer, and that when a trailer vehicle is coupled, this trailer status is recognized if the current characteristic value, i.e. the current opening-pulse number $n_P$ is larger than the reference value determined when no trailer vehicle is coupled.

The line volume $V_{BC}$ of the brake control line is determined as the line volume of the brake control line 42 that extends as far as the "Brake" coupling head 6, if the current opening-pulse number $n_P$ matches, to within a specified tolerance, the reference value determined when no trailer vehicle is coupled. In contrast, the line volume $V_{BC}$ of the brake control line is determined as the line volume of a reference value determined when a trailer vehicle is coupled, if the current opening pulse number $n_P$ matches, to within a specified tolerance, the reference value determined when a trailer vehicle is coupled, or by an interpolation between two line volumes of two reference values determined when a trailer vehicle is coupled, if the current opening-pulse number $n_P$ is between the two reference values concerned.

Figure 5:
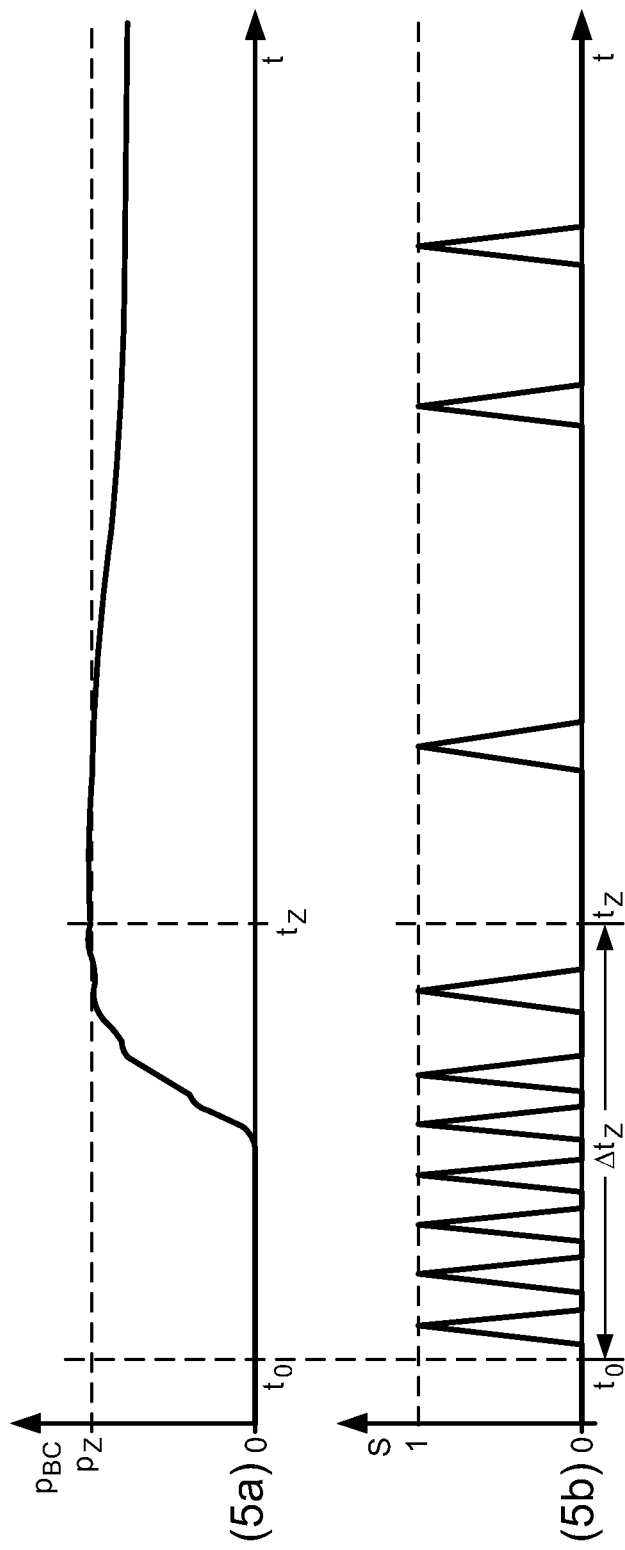
Figure 6:
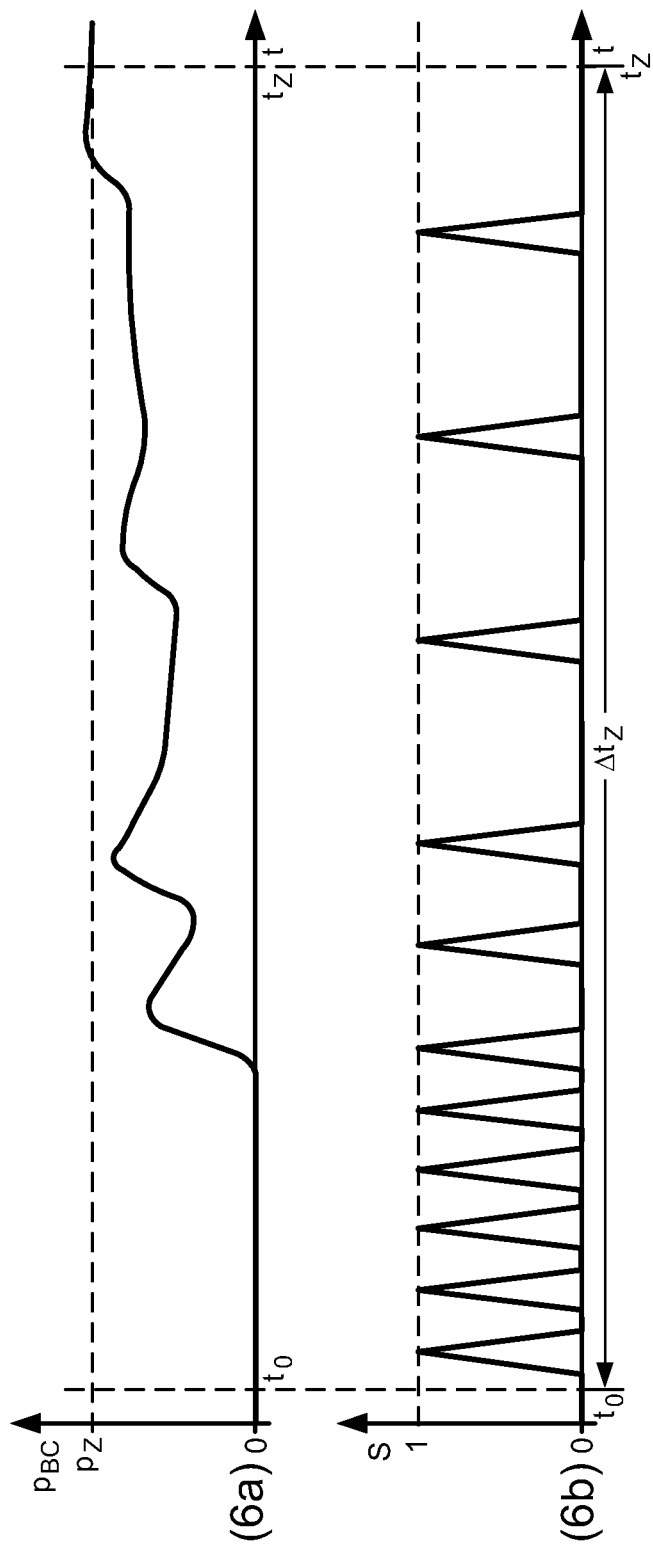

A fourth method variant is illustrated in the diagrams of FIGS. 5 and 6, wherein the part-diagram 5a of FIG. 5 shows the time variation of the brake control pressure $p_{BC}$ during the pressure build-up from time to until the target pressure $p_Z$ is reached at time $t_Z$. The part-diagram 5b of FIG. 5 shows the switching states (0=closed, 1=open) of the inlet valve 12 when no trailer vehicle is coupled. FIG. 6 shows in its part-diagram 6a the time variation of the brake control pressure $p_{BC}$ during the pressure build-up from time to until the target pressure $p_Z$ is reached at time $t_Z$, and the part-diagram 6b shows the switching states (0=closed, 1=open) of the inlet valve 12 when a trailer vehicle is coupled.

To determine a characteristic value, according to the two FIGS. 5 and 6, the time period $\Delta t_Z$ until the target pressure $t_Z$ is reached is determined, which then, as the pressure build-up time, forms the relevant characteristic value. By comparing the current pressure build-up time $\Delta t_Z$ with pressure build-up times determined beforehand for various line volumes of the brake control line and stored as reference values, the current trailer status of the tractor vehicle and/or the current line volume $V_{BC}$ of the brake control line 42, 42' are determined.

By comparing the two FIGS. 5 and 6 it can be seen that to build up the target pressure $p_Z$ in the brake control line 42, 42' when a trailer vehicle is coupled (FIG. 6), a substantially longer pressure build-up time $\Delta t_Z$ is needed than when no trailer vehicle is coupled (FIG. 5). Analogous to the first two method variants, here too it is provided that the trailer status when no trailer vehicle is coupled can be recognized when the current characteristic value, in this case the current pressure build-up time $\Delta t_Z$, matches to within a specified tolerance a reference value determined when no trailer vehicle is coupled, and the trailer status when a trailer vehicle is coupled is recognized when the current reference value, i.e., the current pressure build-up time $\Delta t_Z$, is longer than the reference value determined when no trailer vehicle is coupled.

The line volume $V_{BC}$ of the brake control line is determined as the line volume of the brake control line 42 that extends s far as the "Brake" coupling head 6 when the current pressure build-up time $\Delta t_Z$ matches, to within a specified tolerance, the reference value determined when no trailer vehicle is coupled. In contrast, the line volume $V_{BC}$ of the brake control line is determined as the line volume when a trailer vehicle is coupled if the current pressure build-up time $\Delta t_Z$ matches, to within a specified tolerance, the reference value concerned, or is determined by an interpolation between two line volumes from two reference values determined when a trailer vehicle is coupled, if the current pressure build-up time $\Delta t_Z$ is between the two reference values concerned.

Below, with the diagrams of FIGS. 7 and 8 the process sequence of a fifth method variant is illustrated. The diagrams show in each case the time variations of the brake control pressure $p_{BC}$ in the brake control line 42, 42' which should reach a target pressure $p_Z$ equal to $1.7 \times 10^5$ Pa. In the diagrams, broken lines show the pressure variation in the brake control line 42, 42' when no trailer vehicle is coupled to the tractor vehicle. The pressure variation shown by a continuous line shows the situation when a trailer vehicle is coupled to the tractor vehicle and the storage container $S_Z$ of the tractor vehicle is empty, and the pressure variation shown by a dot-dash line represents the situation when a trailer vehicle is coupled and the storage container $S_A$ of the trailer vehicle is empty.

Figure 7:
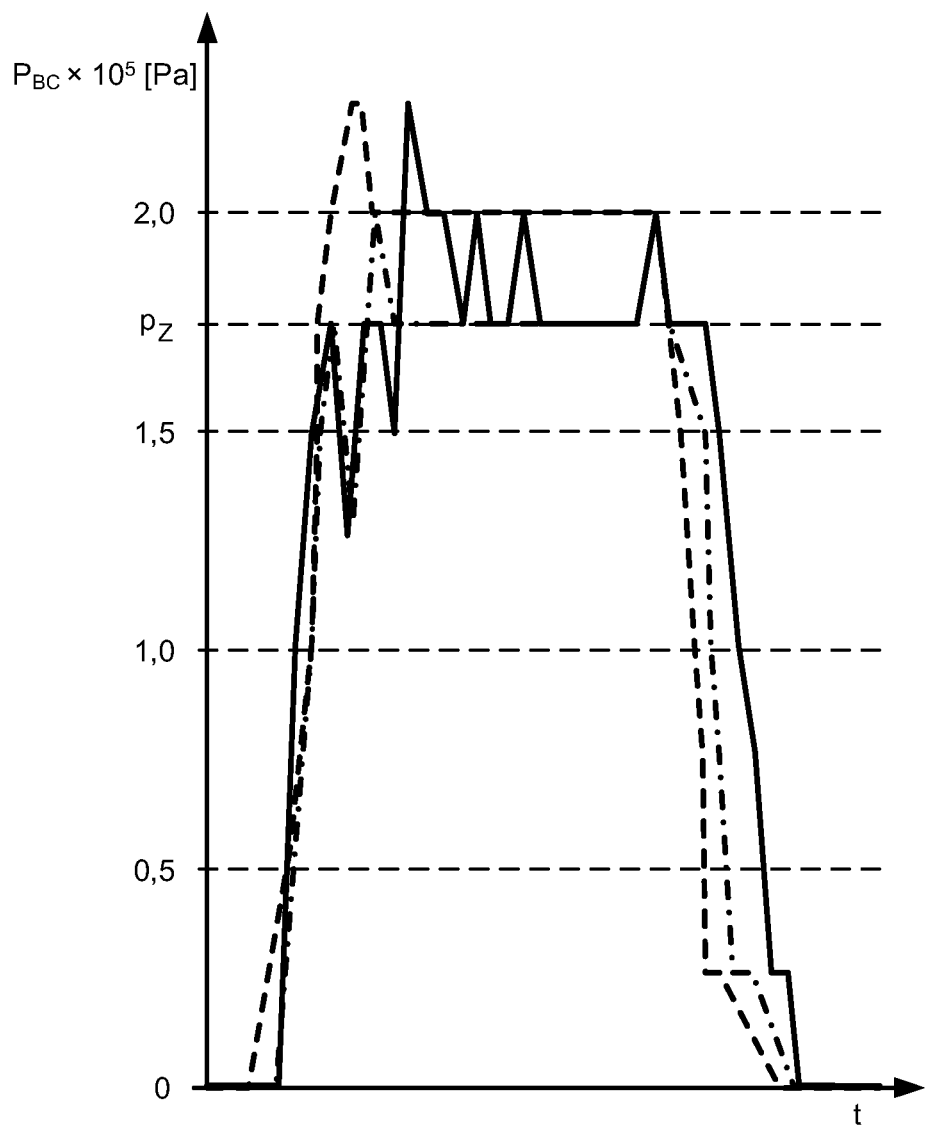
FIG. 7: A brake control pressure variation over time during the production of a target pressure in a brake control line, with an uncoupled and a coupled trailer vehicle, with storage containers filled to different extents and a supply pressure of $4 \times 10^5$ Pa in the storage container of the tractor vehicle.
Figure 8:
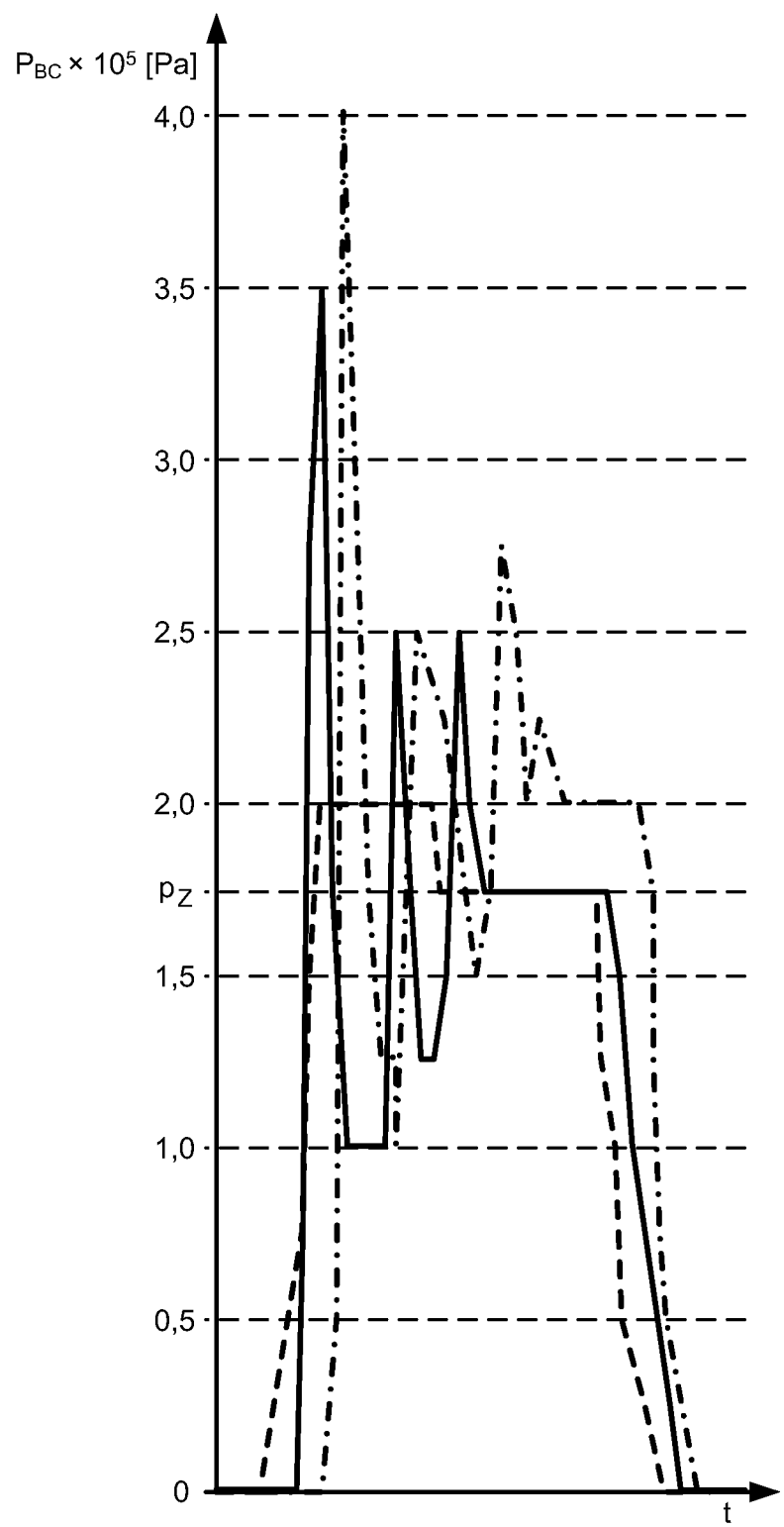
FIG. 8: A brake control pressure variation over time during the production of a target pressure in a brake control line, with an uncoupled and a coupled trailer vehicle, with storage containers filled to different extents and a supply pressure of $6 \times 10^5$ Pa in the storage container of the tractor vehicle.

The pressure variations shown in FIG. 7 were measured in a supply pressure line connected to the supply pressure inlet p11, in which there is a supply pressure of $p_V=4\times10^5$ Pa. The pressure variations shown in FIG. 8 were determined at a supply pressure of $p_V=6\times10^5$ Pa applied at the supply pressure inlet p11. By a comparison of the diagrams of FIGS. 7 and 8, the influence of different supply pressures $p_V$ can be made clear.

After a prolonged driving interruption, the supply pressure $p_V$ in the supply lines and the storage containers of a tractor vehicle and/or a trailer vehicle connected to them can fall due to leakage, so that when the traction vehicle begins operating again at first a relatively low supply pressure $p_V$ is available, owing to which the venting of the brake control line 42, 42' is delayed.

To determine a characteristic value suitable for determining the volume of the brake control line connected, and with which it can be established whether a trailer vehicle is pneumatically connected to the tractor vehicle, this method variant provides that the number and/or the average amplitude of pressure oscillations of the brake control pressure $p_{BC}$ until the target pressure $p_Z$ has been reached is detected as a number of oscillations $n_S$ and/or an average oscillation amplitude $A_{S\_m}$ that forms the characteristic value.

By comparing the current number of oscillations $n_S$ and/or the current oscillation amplitude $A_{S\_m}$ with oscillation number values and/or oscillation amplitude values determined beforehand and stored for various line volumes of the brake control line as reference values, the current trailer status of the tractor vehicle and/or the current line volume $V_{BC}$ of the brake control line 42, 42' are determined.

The trailer status as regards an uncoupled trailer vehicle is recognized if the current number of oscillations $n_S$ and/or the current average oscillation amplitude $A_{S\_m}$ matches, to within a specified tolerance, a reference value determined when no trailer vehicle is coupled. The trailer status as regards a coupled trailer vehicle is recognized if the current oscillation number $n_S$ and/or the current oscillation amplitude $A_{S\_m}$ is larger than the reference value determined when no trailer vehicle is coupled.

The line volume $V_{BC}$ of the brake control line is determined as the line volume of the brake control line 42 extending as far as the "Brake" coupling head 6, when the current number of oscillations $n_S$ and/or the current average oscillation amplitude $A_{S\_m}$ match, to within a specified tolerance, a reference value determined when no trailer vehicle is coupled. In contrast, the line volume $V_{BC}$ of the brake control line is determined as the line volume from a reference value determined when a trailer vehicle is coupled if, to within a specified tolerance, the current oscillation number $n_S$ and/or the current average oscillation amplitude $A_{S\_m}$ match the reference value concerned, or is determined by interpolation between two line volumes from two reference values determined when the current oscillation number $n_S$ and/or the current average oscillation amplitude $A_{S\_m}$ is between the two reference values concerned.

From the curve shapes of the brake control pressure $p_{BC}$ in the diagrams of FIG. 7 and it is evident in both cases that the oscillation number $n_S$ and the average oscillation amplitude $A_{S\_m}$ when a trailer vehicle is coupled are larger than when no trailer vehicle is coupled, and are larger with empty storage containers $S_Z$, $S_A$ of both the tractor vehicle and the trailer vehicle than with an empty storage container $S_Z$ of the tractor vehicle alone. By comparing the diagram for the supply pressure $p_V=4\times10^5$ Pa in FIG. 7 with the diagram for the supply pressure $p_V=6\times10^5$ Pa in FIG. 8, it can also be seen that the oscillation number $n_S$ and the average oscillation amplitude $A_{S\_m}$ increase with increasing supply pressure $p_V$.

Figure 9:
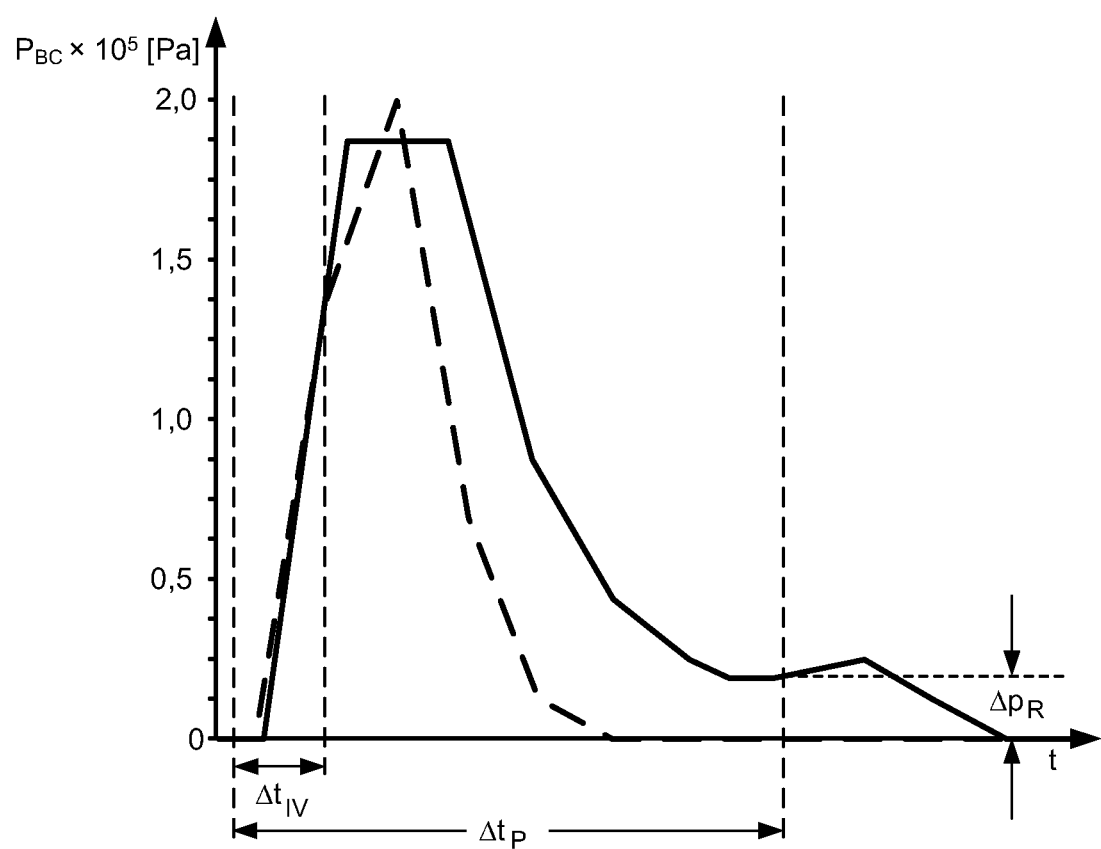
FIG. 9: A brake control pressure variation over time during the production of a pressure pulse in a brake control line, with an uncoupled and a coupled trailer vehicle.

The diagram of FIG. 9 illustrates a sixth method variant, wherein the diagram contains the time variation of a pressure pulse produced in the brake control line 42, 42' when no trailer vehicle is coupled (shown by a broken line) and with a trailer vehicle coupled (shown by a continuous line). By comparing the two pressure variations it can be seen that after a time period $\Delta t_P$ when no trailer vehicle is coupled there is a residual pressure $\Delta p_R$, whereas in contrast when a trailer vehicle is coupled there is no residual pressure.

This method variant provides that a pneumatic pulse to be produced in the brake control line 42, 42' with a fixed opening duration $\Delta t_{IV}$ of the inlet valve 12 is specified, and that the pressure pulse is produced in the brake control line 42, 42' by a pulse-like opening of the inlet valve 12, and that the brake control pressure $p_{BC}$ present in the brake control line 42, 42' after a specified time interval $\Delta t_P$ is measured by sensor means as a residual pressure $\Delta p_R$, and that the residual pressure $\Delta p_{PR}$ is compared with a reference value determined beforehand as a function of the trailer status of the tractor vehicle and/or of the line volume of the brake control en 42 and stored in a data memory of the control unit 8, and that depending on the result of the comparison the trailer status of the tractor vehicle and/or the line volume $V_{BC}$ of the brake control line 42, 42' is/are determined.

The trailer status when no trailer vehicle is coupled is recognized if the current residual pressure $\Delta p_R$, to within a specified tolerance, matches a reference pressure value determined when no trailer vehicle is coupled, and the trailer status when a trailer vehicle is coupled is recognized if the current residual pressure $\Delta p_R$ is lower than the reference pressure value determined when no trailer vehicle is coupled.

The line volume $V_{BC}$ of the brake control line 42, 42' is determined as the line volume of the brake control line 42 that extends as far as the "Brake" coupling head 6 when the current residual pressure $\Delta p_R$, to within a specified tolerance, matches the reference pressure value determined when no trailer vehicle is coupled. In contrast, the line volume $V_{BC}$ of the brake control line 42, 42' is determined as the line volume of a reference pressure value when a trailer vehicle is coupled, if the current residual pressure $\Delta p_R$, to within a specified tolerance, matches the reference pressure value concerned, or is determined by an interpolation between two line volumes of two reference pressure values determined when a trailer vehicle is coupled if the current residual pressure $\Delta p_R$ is between the two reference pressure values concerned.

INDEXES

2 Trailer control valve
4, 4' "Supply" coupling head (red)
6, 6' "Brake" coupling head (yellow)
8 Electronic control unit
10 Relay valve
12 Inlet valve, 2/2-way magnetic valve
14 Outlet valve, 2/2-way magnetic valve
16 Breakaway valve
18 Pressure sensor
20 Control lines
22 Sensor lines
24 Direct control inlet
26 Inverted control inlet
28 Control pressure line
28a Line branch
30 Supply pressure line
30a, 30b Line sections
32 Venting line
32a Connecting line
34, 34' Supply pressure line
36 Brake control line
38 Sensor pressure line
40 Control pressure line
42, 42' Brake control line
$A_{S\_m}$ Average oscillation amplitude
IV Inlet valve
$n_P$ Number of opening pulses
$n_{P\_IV}$ Number of opening pulses of the inlet valve
$n_{P\_OV}$ Number of opening pulses of the outlet valve
$n_S$ Number of oscillations
OV Outlet valve
$p_3$ Venting outlet
$p_{11}$ Supply pressure inlet
$p_{21}$ Supply pressure outlet
$p_{22}$ Brake control outlet
$p_{43}$ inverted control pressure inlet
$p_{BC}$ Brake control pressure
$p_V$ Supply pressure
$p_Z$ Target pressure
$P_{IV}$ Opening pulse of the inlet valve
$P_{OV}$ Opening pulse of the outlet valve
$PW_{IV}$ Pulse width of an opening pulse of the inlet valve
$PW_{OV}$ Pulse width of an opening pulse of the outlet valve
R1-R8 Reference values
S Switching state of the inlet or outlet valve
$S_A$ Pressure reservoir of the trailer
$S_Z$ Pressure reservoir of the tractor vehicle
t Time
$t_o$ Time-point at the start of venting
$t_Z$ Time-point when the target value is reached
$V_{BC}$ Line volume of the brake control line $\Delta p_R$ Residual pressure
$\Delta t_V$ Opening duration of the inlet valve
$\Delta t_P$ Time interval until residual pressure measurement
$\Delta t_Z$ Time interval until pressure build-up, pressure build-up time

The invention claimed is:

1. A method for controlling the brakes of a vehicle combination, the method comprising:
providing a vehicle combination comprising:
a tractor vehicle having a hydraulic or pneumatic brake system;
at least one trailer vehicle configured to be coupled to the tractor vehicle and having a pressure-controlled pneumatic brake system;
an electronic control unit ; and
an electronically controlled brake control valve arranged in the tractor vehicle and comprising at least two magnetic switching valves that include an inlet valve and an outlet valve, the at least two magnetic switching valves configured to be controlled by the electronic control unit; and
a brake control line that runs from a brake control outlet of the brake control valve to a "Brake" coupling head of the tractor vehicle or to a trailer brake valve of the trailer vehicle and/or a "Brake" coupling head at the rear of the trailer vehicle;
producing, by means of the brake control valve, a brake control pressure in the brake control line;
determining a current trailer status of the tractor vehicle and/or a current line volume of the brake control line, thereby determining whether the tractor vehicle is connected to the at least one trailer vehicle and/or determining a line volume of the brake control line;
specifying a target pressure to be produced in the brake control line;
producing the target pressure in the brake control line by pulse-like opening of the inlet valve and/or by pulse-like opening of the outlet valve;
measuring the brake control pressure in the brake control line by sensor means during pressure build-up;
determining, from a time variation of the brake control pressure and/or a time variation of switching states of the inlet valve and/or the outlet valve until the target pressure has been reached, a characteristic value for the trailer status of the tractor vehicle and/or the line volume of the brake control line;
comparing the characteristic value with at least one reference value determined as a function of the trailer status of the tractor vehicle and/or as a function of the line volume of the brake control line, wherein the at least one reference value is stored in a data memory of the control unit; and
determining the line volume of the brake control line based on a result of comparing the characteristic value with the at least one reference value.

2. The method according to claim 1, comprising:
detecting pulse widths of the opening pulses of the inlet valve and the outlet valve until the target pressure has been reached;
adding the pulse widths of the opening pulses of the inlet valve and the outlet valve to form a pulse width sum for the inlet valve and a pulse width sum for the outlet valve;
determining a pulse width sum difference as a characteristic value by subtracting the pulse width sum for the outlet valve from the pulse width sum for the inlet valve;
comparing the pulse width sum difference with previously determined values of the pulse width sum difference for various line volumes of the brake control line as reference values; and
determining the current trailer status of the tractor vehicle and/or the current line volume of the brake control line.

3. The method according to claim 1, comprising:
determining opening pulses of the inlet valve and/or of the outlet valve until the target pressure has been reached;
summing the opening pulses of the inlet valve and/or of the outlet valve until the target pressure has been reached, to form a current opening pulse number as a characteristic value;
comparing the current opening pulse number with previously determined values of the opening pulse number for various line volumes of the brake control line and stored as reference values; and
determining the current trailer status of the tractor vehicle and/or the current line volume of the brake control line.

4. The method according to claim 1, comprising:
detecting a number of opening pulses of the inlet valve and of the outlet valve until the target pressure has been reached;
adding the number of opening pulses of the inlet valve to form an opening pulse number for the inlet valve;
adding the number of opening pulses of the outlet valve to form an opening pulse number for the outlet valve;
subtracting the opening pulse number for the outlet valve from the opening pulse number for the inlet valve to obtain a pulse number difference as a characteristic value;
comparing the pulse number difference with previously determined values of the pulse number difference for various line volumes of the brake control line and stored as reference values;
determining the current trailer status of the tractor vehicle and/or the current line volume of the brake control line.

5. The method according to claim 1, comprising:
determining a time period until the target pressure has been reached, as the pressure build-up time, the pressure build-up time forming the characteristic value;
comparing the pressure build-up time with previously determined values of the pressure build-up time for various line volumes of the brake control line and stored as reference values; and
determining the current trailer status of the tractor vehicle and/or the current line volume of the brake control line.

6. The method according to claim 1, comprising:
detecting a number and/or an average amplitude of pressure oscillations of the brake control pressure until the target pressure has been reached, as a reference-value-forming oscillation number and/or average oscillation amplitude;
comparing a current number of oscillations and/or the average oscillation amplitude with previously determined values of oscillation number and/or previously determined values of oscillation amplitude for various line volumes of the brake control line and stored as reference values; and
determining the current trailer status of the tractor vehicle and/or the current line volume of the brake control line.

7. The method according to claim 1, comprising:
determining that the current characteristic value matches the reference value within a specified tolerance; and
recognizing a trailer status as not coupled for a trailer vehicle.

8. The method according to claim 7, comprising:
determining the line volume of the brake control line as the line volume of a brake control line that extends as far as the "Brake" coupling head.

9. The method according to claim 1, comprising:
determining that the current reference value is larger than the reference value; and
recognizing a trailer status as coupled for a trailer vehicle.

10. The method according to claim 9, comprising:
determining the line volume of the brake control line as the line volume of a reference value determined when the trailer vehicle is coupled if the current reference value, to within a specified tolerance, matches the reference value concerned or determining, by interpolation between two line volume values from reference values, that the current reference value is between two reference values concerned.

11. A method for controlling the brakes of a vehicle combination, the method comprising:
providing a vehicle combination comprising:
a tractor vehicle having a hydraulic or pneumatic brake system;
at least one trailer vehicle configured to be coupled to the tractor vehicle and having a pressure-controlled pneumatic brake system;
an electronically controlled brake control valve arranged in the tractor vehicle, the electronically controlled brake valve comprising at least two magnetic switching valves that include an inlet valve and an outlet valve, wherein the brake control valve is configured to produce a brake control pressure in a brake control line that runs from a brake control outlet of the brake control valve as far as a "Brake" coupling head of the tractor vehicle or as far as a trailer brake valve of the trailer vehicle and/or a "Brake" coupling head at the rear of the trailer vehicle:
determining a current trailer status of whether the tractor vehicle is connected to the at least one trailer vehicle and/or determining a line volume of the brake control line;
specifying a pneumatic pressure pulse to be produced in the brake control line with a fixed opening duration of the inlet valve;
producing the pressure pulse in the brake control line by a pulse-like opening of the inlet valve;
determining, by sensor means and after a specified time interval after closing the inlet valve, a brake control pressure in the brake control line as a residual pressure;
comparing the residual pressure with a reference pressure value determined beforehand as a function of the trailer status of the tractor vehicle and/or of the line volume of the brake control line and stored in a data memory of the control unit; and
determining, based on a result of comparing the residual pressure, the current trailer status of the tractor vehicle and/or the line volume of the brake control line.

12. The method according to claim 11, comprising:
determining that the residual pressure matches a reference pressure value, within a specified tolerance, when no trailer vehicle is coupled to the tractor vehicle; and
recognizing that the at least one trailer vehicle is coupled to the tractor vehicle.

13. The method according to claim 11, comprising:
determining that the residual pressure is lower than the reference pressure value when no traile vehicle is coupled to the tractor vehicle; and
recognizing that the at least one trailer vehicle is coupled to the tractor vehicle.

14. The method according to claim 11, comprising:
determining that the residual pressure, to matches the reference pressure value, within a specified tolerance, determined when the at least one trailer vehicle is not coupled; and
determining the line volume of the brake control line as the line volume of a brake control line that extends as far as the "Brake" coupling head.

15. The method according to claim 11, comprising:
determining the line volume of the brake control line as the line volume of the reference pressure value determined when a trailer vehicle is coupled;
determining that the current residual pressure, to within a specified tolerance, matches the reference pressure value concerned, or determining by an interpolation between two line volumes from two reference pressure values determined when the at least one trailer vehicle is coupled, when the current residual pressure is between the two reference pressure values concerned.

16. The method according to claim 11, comprising:
determining the current trailer status of the tractor vehicle and/or the current line volume of the brake control line;
measuring the supply pressure currently present in a supply line of the tractor vehicle; and
comparing a respective characteristic value or a residual pressure with stored reference values or with stored reference pressure values determined beforehand for the corresponding supply pressure.

17. The method according to claim 11, wherein determining the current trailer status of the tractor vehicle and/or the current line volume of the brake control line is/are determined automatically after every resumption of the operation of the tractor vehicle and/or after each release of the parking brake in the tractor vehicle.

* * * * *

UNITED STATES PATENT AND TRADEMARK OFFICE
CERTIFICATE OF CORRECTION

| | |
|---|---|
| PATENT NO. | : 12,403,882 B2 |
| APPLICATION NO. | : 18/541619 |
| DATED | : September 2, 2025 |
| INVENTOR(S) | : Ivo Laskawy et al. |

Page 1 of 1

It is certified that error appears in the above-identified patent and that said Letters Patent is hereby corrected as shown below:

In the Claims

In Claim 14, Column 18, Line 19, delete ", to"

Signed and Sealed this
Ninth Day of December, 2025

John A. Squires
*Director of the United States Patent and Trademark Office*